(12) United States Patent
Ahn et al.

(10) Patent No.: US 11,647,154 B2
(45) Date of Patent: May 9, 2023

(54) DIGITAL DESK AND IMAGE CONTROL METHOD USING SAME

(71) Applicant: Hyosung TNS Inc., Seoul (KR)

(72) Inventors: Young Ho Ahn, Hwaseong-si (KR); Yoo Mee Min, Seongnam-si (KR); Young Jin Yoon, Seoul (KR); Hyeokjun Yun, Seoul (KR); Won Seok Lee, Wonju-si (KR); Hee-youn Lee, Gwangju-si (KR); Byung Seok Han, Seongnam-si (KR)

(73) Assignee: Hyosung TNS Inc., Seoul (KR)

( * ) Notice: Subject to any disclaimer, the term of this patent is extended or adjusted under 35 U.S.C. 154(b) by 38 days.

(21) Appl. No.: 17/115,310

(22) Filed: Dec. 8, 2020

(65) Prior Publication Data

US 2022/0086392 A1 Mar. 17, 2022

(30) Foreign Application Priority Data

Sep. 15, 2020 (KR) .......................... 10-2020-0118553

(51) Int. Cl.
*H04N 7/14* (2006.01)
*G06F 3/01* (2006.01)
*G06F 3/16* (2006.01)
*H04N 7/15* (2006.01)

(52) U.S. Cl.
CPC ............ *H04N 7/147* (2013.01); *G06F 3/013* (2013.01); *G06F 3/167* (2013.01); *H04N 7/142* (2013.01); *H04N 7/152* (2013.01)

(58) Field of Classification Search
None
See application file for complete search history.

(56) References Cited

U.S. PATENT DOCUMENTS

| | | | |
|---|---|---|---|
| 9,795,322 B1* | 10/2017 | Karunaratne | A61B 5/6891 |
| 2014/0347267 A1 | 11/2014 | Nishi et al. | |
| 2018/0033171 A1 | 2/2018 | Rakshit | |
| 2018/0275504 A1* | 9/2018 | Ono | G03B 21/10 |
| 2020/0211283 A1 | 7/2020 | Krauthamer | |
| 2020/0372902 A1* | 11/2020 | Takami | H04N 9/31 |
| 2021/0049238 A1* | 2/2021 | Vaughn | G06N 20/00 |
| 2021/0090545 A1* | 3/2021 | Clark | G06F 3/165 |
| 2021/0217183 A1* | 7/2021 | Corson | H04N 5/2354 |

(Continued)

FOREIGN PATENT DOCUMENTS

| | | |
|---|---|---|
| EP | 2 500 816 A | 9/2012 |
| JP | 2004-32117 A | 1/2004 |
| JP | 2019-192026 A | 10/2019 |

(Continued)

OTHER PUBLICATIONS

Matsuda Tsusho Co., Ltd., "Let's start a stress-free window income", Apr. 17, 2019, 16 pages.

(Continued)

*Primary Examiner* — Mohamed A. Wasel
*Assistant Examiner* — Mohammad Yousuf A. Mian
(74) *Attorney, Agent, or Firm* — Fish & Richardson P.C.

(57) ABSTRACT

A digital desk includes a transparent display unit provided between a counselor and a customer, and a control unit configured to control an image displayed on the transparent display unit based on information on presence or absence of the counselor.

10 Claims, 5 Drawing Sheets

(56) References Cited

U.S. PATENT DOCUMENTS

2021/0390953 A1* 12/2021 Makker ................ E06B 3/6722

FOREIGN PATENT DOCUMENTS

| | | | |
|---|---|---|---|
| JP | 2019-194800 A | | 11/2019 |
| KR | 20040022969 A | * | 3/2004 |
| KR | 10-2005-0081163 A | | 8/2005 |
| KR | 10-2012-0104475 A | | 9/2012 |
| KR | 10-2016-0138681 A | | 12/2016 |
| KR | 10-1775559 B | | 9/2017 |
| WO | 2020/121771 A | | 6/2020 |
| WO | WO-2021149094 A1 * | 7/2021 | ............. G06Q 10/10 |

OTHER PUBLICATIONS

Li, Jiannan et al., A two-sided collaborative transparent display supporting workspace awareness, International Journal of Human-Computer Studies, May 2017, vol. 101, pp. 23-44.
Extended European Search Report issued in EP20210677.9 dated Jun. 7, 2021, 8 pages.
International Search Report issued in PCT/KR2020/015295 dated Apr. 27, 2021, 3 pages.

* cited by examiner

DIGITAL DESK AND IMAGE CONTROL METHOD USING SAME

CROSS-REFERENCE TO RELATED APPLICATIONS

This application is based on and claims priority from Korean Patent Application No. 10-2020-0118553 filed on Sep. 15, 2020, the disclosures of which are incorporated herein in its entirety by reference for all purposes.

TECHNICAL FIELD

The present disclosure relates to a digital desk.

BACKGROUND

In general, due to the continuous development of information and communication technology, financial transactions that were made through face-to-face authentication have recently been transferred to a non-face-to-face financial transaction method using non-face-to-face authentication based on a wired or wireless communication network, and currently, among the above non-face-to-face financial transactions, only the amount of financial transactions through internet banking reaches 18 trillion won per day.

A counselor working at a bank may vacate the seat due to going to a restroom, going to vacation, or going out for lunch. Accordingly, there is a problem that it is difficult to utilize the seat having been occupied by the counselor.

SUMMARY

In view of the above, the present disclosure provides a digital desk that enables banking by utilizing an empty space for a counselor, and an image control method using the same.

In accordance with a first aspect of the present disclosure, there is provided a digital desk including: a transparent display unit provided between a counselor and a customer; and a control unit configured to control an image displayed on the transparent display unit based on information on presence or absence of the counselor.

The control unit may control the transparent display unit to be transparent when information on the presence of the counselor exists, and may control an image of a first virtual counselor to be displayed on the transparent display unit when the information on the presence of the counselor does not exist.

The digital desk may further include a sensor unit configured to detect at least one of positions of the counselor and the customer.

The sensor unit may include at least one of a camera, an infrared sensor, and an ultrasonic sensor.

The control unit may control an operation of the transparent display unit to display a first virtual counselor on an area at which the customer gazes.

A second virtual counselor or financial information may be displayed on an area other than the area at which the customer gazes.

The sensor unit may be provided in chairs where the counselor and the customer are seated.

The digital desk may further include: a voice input unit configured to receive a voice of the counselor; and a voice output unit configured to output the voice of the counselor to the customer.

When the counselor exist, the control unit may control a point of time when the voice of the counselor is transmitted through the voice output unit.

The digital desk may further include: a voice transfer unit configured to receive a voice of the customer or to transfer a voice of at least one of the first virtual counselor and the second virtual counselor, wherein the voice transfer unit is disposed in the transparent display unit, and wherein the control unit controls a point of time when a voice of the first virtual counselor is transmitted through the voice transfer unit when the counselor does not exist.

The digital desk may further include a voice transfer unit configured to receive a voice of the customer or to transfer a voice of at least one of the first virtual counselor and the second virtual counselor, wherein the voice transfer unit is disposed in the transparent display unit, and wherein, when the counselor exist, the control unit controls a point of time when the voice of the counselor is transmitted through the voice output unit and a point of time when a voice of the second virtual counselor is transmitted through the voice transfer unit.

The digital desk may further include a touch panel unit configured to receive an input of touch information from the customer.

The control unit may control the touch panel unit to display the customer's personal information.

In accordance with a first aspect of the present disclosure, there is provided a method for controlling an image using a digital desk, the method including: collecting position information of a counselor; and operating a transparent display unit to be transparent when position information of the counselor exists, or operating the transparent display unit to display an image of a virtual counselor when the position information of the counselor does not exist.

According to an implementation, a digital desk enabling financial affairs to be performed is provided, thereby enabling banking even without a counselor.

In addition, according to an implementation, by controlling the operation of a transparent display unit according to the position of a customer, convenient banking can be performed.

In addition, according to an implementation, the accuracy on the position of a customer can be enhanced by measuring the position of the customer's body part and detecting the position.

In addition, according to an implementation, a customer's participation can be induced at times outside of financial business by providing advertisements using the customer's motion.

DETAILED DESCRIPTION

Figure 1:
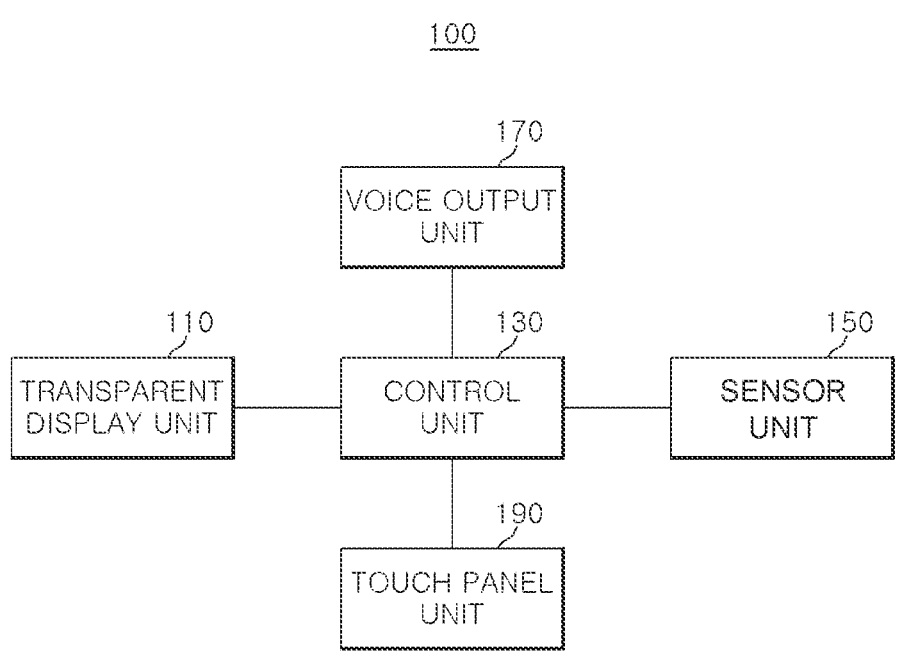
FIG. 1 is a block diagram showing a digital desk according to an implementation of the present disclosure.

Hereinafter, configurations and operations of implementations will be described in detail with reference to the accompanying drawings. The following description is one of various patentable aspects of the disclosure and may form a part of the detailed description of the disclosure.

In describing the implementations of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various implementations. Specific implementations will be exemplarily illustrated in the drawings and described in the detailed description of the implementations. However, it should be understood that they are not intended to limit the disclosure to specific implementations but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

Figure 2:
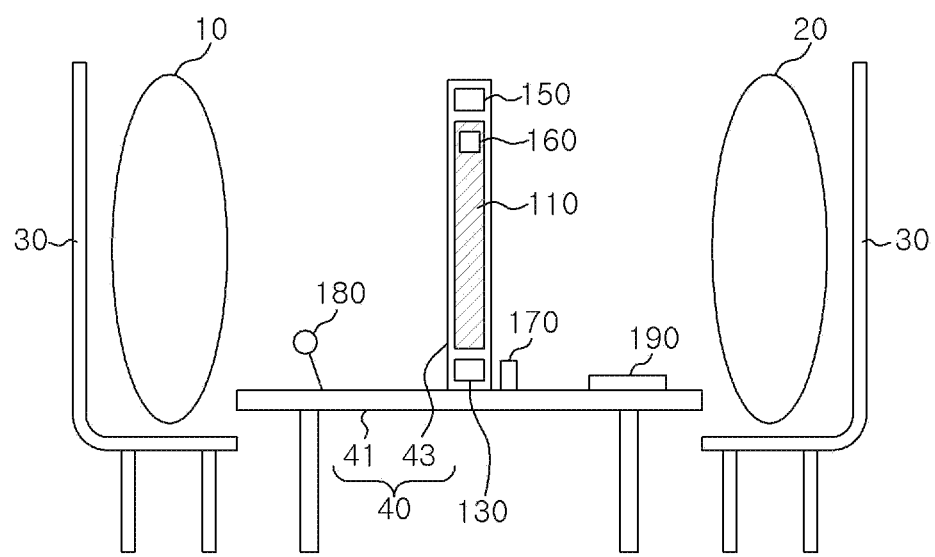
FIG. 2 is a side view showing the digital desk according to the implementation.
Figure 3:
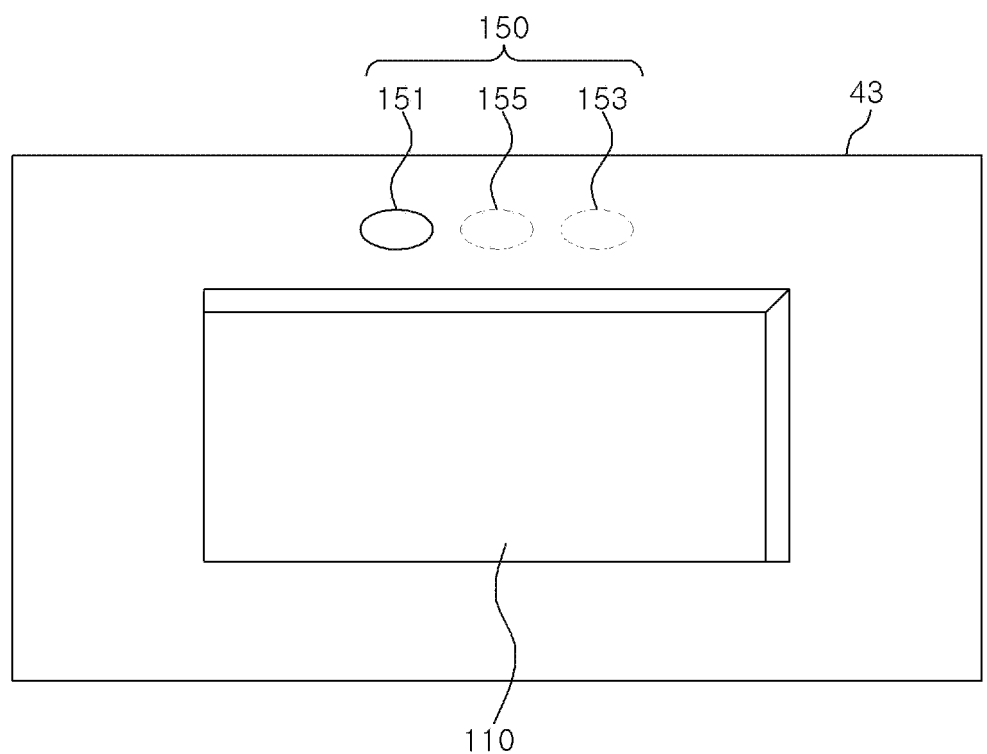
FIG. 3 is a front view of a transparent display unit of the digital desk according to the implementation.
Figure 4:
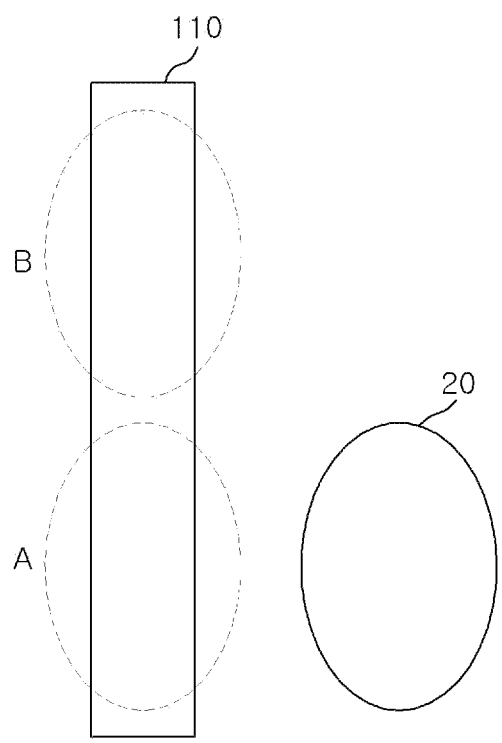
FIGS. 4 and 5 are views showing a state in which a transparent display unit is operated according to a customer's position.
Figure 5:
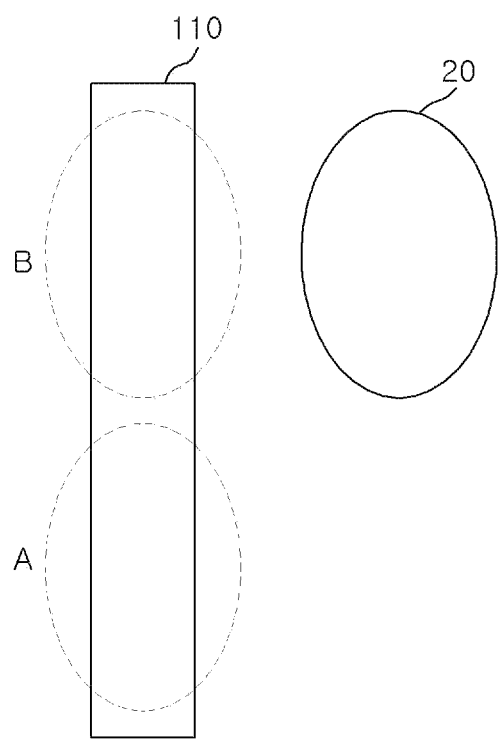

FIG. 1 is a block diagram showing a digital desk according to an implementation of the present disclosure, FIG. 2 is a side view showing the digital desk according to the implementation, FIG. 3 is a front view of a transparent display unit of the digital desk according to the implementation, and FIGS. 4 and 5 are views showing a state in which a transparent display unit is operated according to a customer's position.

Referring to FIG. 1, a digital desk 100 according to the implementation of the present disclosure may include a transparent display unit 110.

The transparent display unit 110 may be operated to display a counselor or a virtual counselor in charge of financial affairs to a customer. Here, the virtual counselor may be a first virtual counselor formed by computer graphics or a real counselor who has been away, but it is not limited thereto.

As illustrated in FIG. 2, the transparent display unit 110 may be disposed between a counselor 10 and a customer 20. The transparent display unit 110 may include a transparent light emitting diode (LED), a transparent liquid crystal display (LCD), a transparent organic light emitting diode (OLED), a head-up display (HUD), or the like, but it is not limited thereto.

The transparent display unit 110 may be disposed in a desk 40. The desk 40 may include a lower plate 41 and an upper plate 43. The lower plate 41 may be formed in the shape of a table, and the upper plate 43 may be disposed on the lower plate 41 to be disposed between the counselor 10 and the customer 20.

As illustrated in FIG. 3, the upper plate 43 of the desk 40 may be formed of a transparent acrylic plate, and may support the transparent display unit 110. The transparent display unit 110 may be disposed in a center area of the upper plate 43, but the position thereof is not limited thereto. In addition, it has been described that there is only one transparent display unit 110, but without being limited thereto, a plurality of transparent display units 110 may be disposed on the upper plate 43. In addition, although it is illustrated that the transparent display unit 110 is formed in a square shape, the shape thereof is not limited thereto.

Returning to FIG. 1, the digital desk 100 according to the implementation of the present disclosure may include a control unit 130.

The control unit 130 may control the operation of the transparent display unit 110. The control unit 130 may operate the transparent display unit 110 according to the presence or absence of the counselor 10. For example, if the counselor 10 is seated at a seat, the control unit 130 may control an operation of the transparent display unit 110 so that the transparent display unit 110 is transparent. On the other hand, when the counselor 10 is away from the seat, the control unit 130 may control to display an image of the virtual counselor on the transparent display unit 110.

Alternatively, the control unit 130 may operate the transparent display unit 110 based on the presence or absence of a customer. For example, the control unit 130 may control the transparent display unit 110 to be transparent so that the counselor 10 can be seen when the customer 20 is seated at the seat, or may control the transparent display unit 110 so that the virtual counselor is displayed as an image. On the other hand, the control unit 130 may not operate the transparent display unit 110 when the customer 20 is not present.

In this way, the control unit 130 may control an operation of the transparent display unit 110 in various ways according to the presence or absence of the counselor 10, the presence or absence of the customer 20, or the presence or absence of the counselor 10 and the customer 20.

As illustrated in FIG. 2, the control unit 130 may be disposed below the transparent display unit 110, but the position thereof is not limited. Alternatively, the control unit 130 may be disposed in the transparent display unit 110. Alternatively, the control unit 130 may be disposed in a separate space other than the desk 40, but it is not limited thereto.

Returning to FIG. 1, the digital desk 100 according to the implementation of the present disclosure may include a sensor unit 150.

The sensor unit 150 may sense a position of the counselor 10 or a position of the customer 20. The sensor unit 150 may include a camera, an image sensor, an ultrasonic sensor, an infrared sensor, and the like, but it is not limited thereto. Two or more types of sensors may be used as the sensor unit 150.

The sensor unit 150 may detect the position of the counselor 10 or the customer 20 by sensing any one of the body parts of the counselor 10 or the customer 20. For example, the sensor unit 150 may detect the position of the counselor 10 or the customer 20 by sensing the direction of the face of the counselor 10 or the customer 20. The sensor unit 150 may detect the position of the counselor 10 or the customer 20 by sensing the gaze direction of the counselor 10 or the customer 20.

As illustrated in FIG. 2, the sensor unit 150 may be disposed upward of the transparent display unit 110, but the position thereof is not limited thereto. As illustrated in FIG. 3, the sensor unit 150 may include a first sensor 151 facing the counselor 10 and a second sensor 153 facing the customer 20. The first sensor 151 may be disposed on a front surface of the upper plate 43 of the desk 40. The second sensor 153 may be disposed on a rear surface of the upper plate 43 of the desk 40. The number of sensors is not limited thereto.

It is illustrated above that the sensor unit 150 is formed in the desk 40, but the sensor unit 150 may also be installed on a chair 30 where the counselor 10 or the customer 20 is seated. Accordingly, the positions of the counselor 10 and the customer 20 may be detected from the position of the chair 30.

Accordingly, the control unit 130 may control an operation of the transparent display unit 110 based on the detected positions of the counselor 10 and the customer 20 from the sensor unit 150.

Returning to FIG. 1, the digital desk 100 according to the implementation of the present disclosure may include a voice input unit 180 and a voice output unit 170.

The voice output unit 170 may output a voice of the counselor 10 or a voice of the virtual counselor to the customer 20.

As illustrated in FIG. 2, the voice output unit 170 may be disposed on the lower plate 41 of the desk 40. When the counselor 10 transmits a voice through the voice input unit 180, the voice output unit 170 may output the voice to the customer 20.

Alternatively, in order to transmit the voice of the customer 20 to the counselor 10, an additional voice output unit and an additional voice input unit may be further provided. In other words, the voice input unit 180 and the voice output unit 170 provided for the counselor 10 can be used as a voice output unit and a voice input unit for the customer, respectively.

A voice transfer unit 160 for outputting the voice of the customer or the voice of the virtual counselor or receiving the voice of the customer may be further included in the transparent display unit 110.

When the counselor 10 is present, the control unit 130 may receive the voice of the counselor 10 from the voice input unit 180 and transmit the voice of the counselor 10 to the customer 20 through the voice output unit 170. On the other hand, when the virtual counselor is displayed as an image on the transparent display unit 110 due to the absence of the counselor 10, the control unit 130 may control to output the voice of the virtual counselor or receive the voice of the customer through the voice transfer unit 160 disposed in the transparent display unit 110. Further, when the counselor 10 exists, the control unit 130 may control a point of time when the voice of the counselor 10 is transmitted through the voice output unit 170. The control unit 130 may control the voice output through a switching operation.

Returning to FIG. 1, the digital desk 100 according to the implementation of the present disclosure may include a touch panel unit 190.

The touch panel unit 190 may receive an input of touch information of the customer 20. The touch panel unit 190 may receive an input of touch information selected based on a screen on which financial information presented by the counselor 10 is displayed.

As illustrated in FIG. 2, the touch panel unit 190 may be disposed on the lower plate 41 of the desk 40. The touch panel unit 190 may be disposed in front of the customer 20 at a distance such that a hand is reachable. It is illustrated above that the touch panel unit 190 is disposed on the lower plate 41 of the desk 40, but the position thereof is not limited thereto, and the touch panel unit 190 may be installed on a surface of a sidewall.

The touch panel unit 190 may include a touchable tablet, but it is not limited thereto.

The control unit 130 may control the touch panel unit 190 so that an area in which information for input is displayed is determined according to the position of the customer 20. For example, the control unit 130 may receive the position of the customer 20 and control an operation of the touch panel unit 190 so that information for input is displayed in an area corresponding to the position of the customer 20.

The control unit 130 may control to display financial information or a second counselor in addition to the image of the counselor 10 or the virtual counselor on the transparent display unit 110. The control unit 130 may control the transparent display unit 110 based on the position of the customer 20. Here, the second counselor may be a fund manager, a counselor such as a tax accountant, or a second virtual counselor.

As illustrated in FIG. 4, when it is detected that the customer 20 is in a position corresponding to a first area A of the transparent display unit 110, the control unit 130 may control the transparent display unit 110 to induce the counselor 10 to be located in a position corresponding to the first area A of the transparent display unit 110 or to display a first virtual counselor in the first area A of the transparent display unit 110. Further, the control unit 130 may control a point of time when the voice of the first virtual counselor is transmitted through the voice transfer unit 160 when the counselor 10 does not exist.

In addition, the control unit 130 may control an operation of the transparent display unit 110 to display financial information or an image of the second virtual counselor in a second area B of the transparent display unit 110.

On the other hand, as illustrated in FIG. 5, when it is detected that the customer 20 is in a position corresponding to the second area B of the transparent display unit 110, the control unit 130 may control the transparent display unit 110 to induce the counselor 10 to be located in a position corresponding to the second area B of the transparent display unit 110 or to display the first virtual counselor in the second area B of the transparent display unit 110.

In addition, the control unit 130 may control the transparent display unit 110 to display financial information or an image of the second virtual counselor on the first area A of the transparent display unit 110.

Further, when the counselor 10 exists, the control unit 130 may controls a point of time when the voice of the counselor 10 is transmitted through the voice output unit 170 and a point of time when a voice of the second virtual counselor is transmitted through the voice transfer unit 160.

When the personal information of the customer 20 is displayed on the transparent display unit 110, the personal information of the customer 20 may be exposed to the outside. Accordingly, the control unit 130 may control the personal information of the customer 20 to be displayed through the touch panel unit 190.

Returning to FIG. 3, the digital desk 100 according to the implementation of the present disclosure may further include a motion detection sensor 155 for detecting a motion of a customer.

The motion detection sensor 155 may be formed to face a customer. The motion detection sensor 155 may be disposed on the rear surface of the upper plate 43 of the desk 40. The position and number of the motion detection sensors may be appropriately determined.

The motion detection sensor 155 may detect various motions such as a hand motion of the customer 20. During a financial transaction, the control unit 130 may receive hand motion information of the customer 20 from the motion detection sensor 155 and make the customer 20 select a menu or another menu based on the hand motion information.

In addition, even when a financial transaction is not conducted, the participation of the customer 20 may be induced by using an advertisement output on the transparent display unit 110, and an advertisement and a next advertisement may be selected by the hand motion of the customer 20.

A method of controlling an image using the digital desk as described above is as follows.

The image control method using the digital desk may include: collecting position information of a counselor; and operating a transparent display unit according to the position information of the counselor. Here, the method of controlling an image using the digital desk may be performed by the control unit of the digital desk.

In the collecting of the position information of the counselor, the collected information may be provided from the sensor unit. The sensor unit may obtain the customer's position information by detecting a specific body part of the customer.

In the operating of the transparent display unit according to the position information of the counselor, when the control unit determines that the position information of the counselor exists, the transparent display unit may be operated to be transparent. On the other hand, if it is determined that the position information of the counselor does not exist, the control unit may control the virtual counselor's image to be displayed on the transparent display unit.

Each of these steps may include operations of the digital desk which are described with reference to FIGS. 1 to 5.

The present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

The above description is merely exemplary description of the technical scope of the present disclosure, and it will be understood by those skilled in the art that various changes and modifications can be made without departing from original characteristics of the present disclosure. Therefore, the implementations disclosed in the present disclosure are intended to explain, not to limit, the technical scope of the present disclosure, and the technical scope of the present disclosure is not limited by the implementations. The protection scope of the present disclosure should be interpreted based on the following claims and it should be appreciated that all technical scopes included within a range equivalent thereto are included in the protection scope of the present disclosure.

What is claimed is:

1. A digital desk comprising:
    a transparent display unit provided between a counselor and a customer;
    a sensor unit configured to detect at least one of positions of the counselor and the customer;
    a voice input unit configured to receive a voice of the counselor;
    a voice output unit configured to output the voice of the counselor to the customer;
    a control unit configured to:
        control an image displayed on the transparent display unit based on information on a presence or absence of the counselor, and
        control an operation of the transparent display unit to display (i) a first virtual counselor on a first area at which the customer gazes and (ii) a second virtual counselor on a second area other than the first area at which the customer gazes; and
    a voice transfer unit configured to receive a voice of the customer and to transfer a voice of at least one of the first virtual counselor or the second virtual counselor,
    wherein the control unit is further configured to:
        control the transparent display unit to be transparent based on the presence of the counselor, and
        based on the presence of the counselor, control (i) a point of time for the voice output unit to output the voice of the counselor and (ii) a point of time for the voice transfer unit to transfer the voice of the second virtual counselor.

2. The digital desk of claim 1, wherein the control unit is configured to control the transparent display unit to display an image of the first virtual counselor when the information on the presence of the counselor does not exist.

3. The digital desk of claim 1, wherein the sensor unit includes at least one of a camera, an infrared sensor, or an ultrasonic sensor.

4. The digital desk of claim 1, wherein the sensor unit is provided in chairs where the counselor and the customer are seated.

5. The digital desk of claim 1,
    wherein the voice transfer unit is disposed in the transparent display unit, and
    wherein the control unit is further configured to control a point of time for the voice transfer unit to transfer the voice of the first virtual counselor based on the absence of the counselor.

6. The digital desk of claim 1, further comprising a touch panel unit configured to receive an input of touch information from the customer.

7. The digital desk of claim 6, wherein the control unit controls the touch panel unit to display personal information of the customer.

8. A method for controlling the digital desk of claim 1, the method comprising:
    collecting position information of the counselor and the customer;
    operating the transparent display unit to be transparent based on the position information of the counselor being collected;
    based on the position information indicating the absence of the counselor, controlling the transparent display unit to display (i) the first virtual counselor on the first area at which the customer gazes and (ii) the second virtual counselor on the second area other than the first area at which the customer gazes;
    based on the position information indicating the presence of the counselor, controlling the transparent display unit to be transparent; and
    based on the position information indicating the presence of the counselor, controlling (i) the point of time for outputting the voice of the counselor through the voice output unit and (ii) the point of time for transferring the voice of the second virtual counselor through the voice transfer unit.

9. The digital desk of claim 1, wherein the control unit is further configured to:
   based on the absence of the counselor, control the transparent display unit to display both of the first virtual counselor and the second virtual counselor.

10. The digital desk of claim 1, wherein the first virtual counselor is a graphical representation of a person who is away from the digital desk, and
   wherein the second virtual counselor is a graphical representation of another person including a fund manager or a tax accountant.

\* \* \* \* \*